US009001406B2

(12) United States Patent
Sheng et al.

(10) Patent No.: US 9,001,406 B2
(45) Date of Patent: Apr. 7, 2015

(54) REFLECTIVE DISPLAY UTILIZING LUMINESCENCE

(75) Inventors: Xia Sheng, Palo Alto, CA (US); Gary Gibson, Palo Alto, CA (US); Dick Henze, Palo Alto, CA (US); Zhang-Lin Zhou, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/996,510

(22) PCT Filed: Dec. 20, 2010

(86) PCT No.: PCT/US2010/061185
§ 371 (c)(1),
(2), (4) Date: Jun. 20, 2013

(87) PCT Pub. No.: WO2012/087269
PCT Pub. Date: Jun. 28, 2012

(65) Prior Publication Data
US 2013/0278987 A1 Oct. 24, 2013

(51) Int. Cl.
G02B 26/00 (2006.01)
G02F 1/03 (2006.01)
G03G 13/00 (2006.01)
G09G 3/34 (2006.01)
G02B 17/00 (2006.01)
G02F 1/1335 (2006.01)
(Continued)

(52) U.S. Cl.
CPC .......... *G02B 17/00* (2013.01); *G02F 1/133514* (2013.01); *G02F 1/133553* (2013.01); *G02B 26/02* (2013.01); *G02F 1/167* (2013.01)

(58) Field of Classification Search
CPC ......... G02G 13/22; G02G 17/04; G09G 3/16; G02F 1/163; G02F 1/03; G02F 1/055; G02F 1/0316; G02F 1/167; G02B 26/001; G02B 26/0841
USPC ......... 359/245, 315, 247, 251–252, 254, 108, 359/237–238, 278–279, 290–292, 298, 359/300–302, 296, 259; 430/31–32; 345/49, 105, 107; 349/33, 38
See application file for complete search history.

(56) References Cited

U.S. PATENT DOCUMENTS

| 6,572,784 | B1 | 6/2003 | Coombs et al. |
| 7,233,373 | B2 | 6/2007 | Katagami et al. |
| 7,811,679 | B2 | 10/2010 | Aziz et al. |

(Continued)

FOREIGN PATENT DOCUMENTS

| JP | 10-020283 A | 1/1998 |
| JP | 11-160697 A | 6/1999 |

OTHER PUBLICATIONS

ISR and WO in corresponding PCT patent application, PCT/US2010/061185, dated Aug. 26, 2011.

*Primary Examiner* — Dawayne A Pinkney
(74) *Attorney, Agent, or Firm* — Michael A. Dryja

(57) ABSTRACT

A reflective color display pixel has a top surface for receiving ambient light, and a plurality of sub-pixels including a first sub-pixel. The first sub-pixel has a broadband mirror and a luminescent layer disposed over the broadband mirror. The luminescent layer contains a luminescent material for absorbing a portion of the ambient light and emitting light of a first color, and a light-absorbing material for absorbing light of wavelengths longer than a wavelength of the first color.

13 Claims, 5 Drawing Sheets

(51) Int. Cl.
  *G02B 26/02*  (2006.01)
  *G02F 1/167*  (2006.01)

(56) References Cited

U.S. PATENT DOCUMENTS

| | | |
|---|---|---|
| 2002/0051104 A1 | 5/2002 | Kurata |
| 2002/0180688 A1* | 12/2002 | Drzaic et al. .................. 345/107 |
| 2008/0094688 A1* | 4/2008 | Baesjou et al. ................ 359/296 |
| 2010/0002414 A1* | 1/2010 | Meir et al. ....................... 362/84 |
| 2010/0060822 A1 | 3/2010 | Sun |
| 2010/0091224 A1 | 4/2010 | Cho et al. |
| 2010/0156780 A1 | 6/2010 | Jacobson et al. |
| 2010/0290208 A1 | 11/2010 | Pickard |

\* cited by examiner

REFLECTIVE DISPLAY UTILIZING LUMINESCENCE

BACKGROUND

Reflective electronic displays are a new type of display device that is gaining popularity and has already been widely used in electronic book readers. In contrast to conventional flat-panel displays, such as LCD displays, that require their own light sources, reflective displays utilize ambient light for illumination to display images that can mimic the look of "ink-on-paper" printed materials. Due to the use of ambient light for illumination, reflective displays have the significant advantages of lower power consumption compared to conventional displays, and the ability to be viewed under bright ambient light. Most of the reflective displays currently commercially available are monochromatic displays, and it is desirable to have reflective displays that can produce color images with satisfactory color brightness. It is also desirable to have reflective color displays that have a relatively simple structure that allows ease of manufacture.

BRIEF DESCRIPTION OF I-HE DRAWINGS

Some embodiments of the invention are described, by way of example, with respect to the following figures.

DETAILED DESCRIPTION

Figure 1:
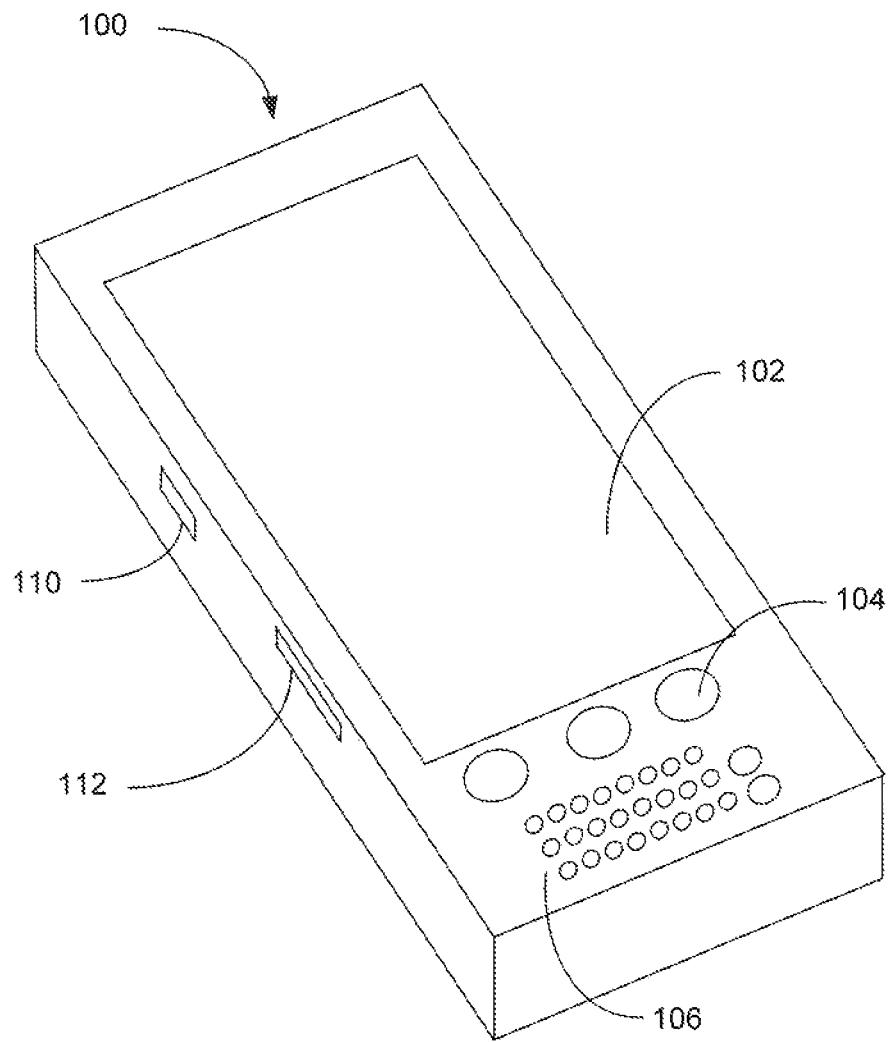
FIG. 1 is a schematic view of a reflective color display device of an embodiment of the invention.

FIG. 1 shows an example of a display device in accordance with the invention. As described, in greater detail below, the display device 100 has a reflective color display screen 102 that is capable of displaying images of high color quality and is configured to utilize backlighting to allow the device to be viewed in low light conditions.

The device 100 has a built-in power source, such as a rechargeable battery, and has electronic circuitry and software for its operations. As illustrated in FIG. 1, the device 100 may have buttons 104 for controlling image display functions and may have a keypad 106 for data entry. Moreover, the display screen 102 may be a touch-screen that can display control features such as scroll bars or control buttons. The display device 100 further includes means for receiving data of images to be displayed. For instance, the device 100 may have USB ports 110 for receiving data and power transmitted through a USB cable, or to receive a USB memory stick with the image date stored thereon. The device 100 may also have receptacles, such as an SD card slot 112, for other types of data storage devices. Alternatively, the device 100 may have wireless transmission capabilities for wirelessly downloading image data from a computer or a network such as the internet.

Figure 2:
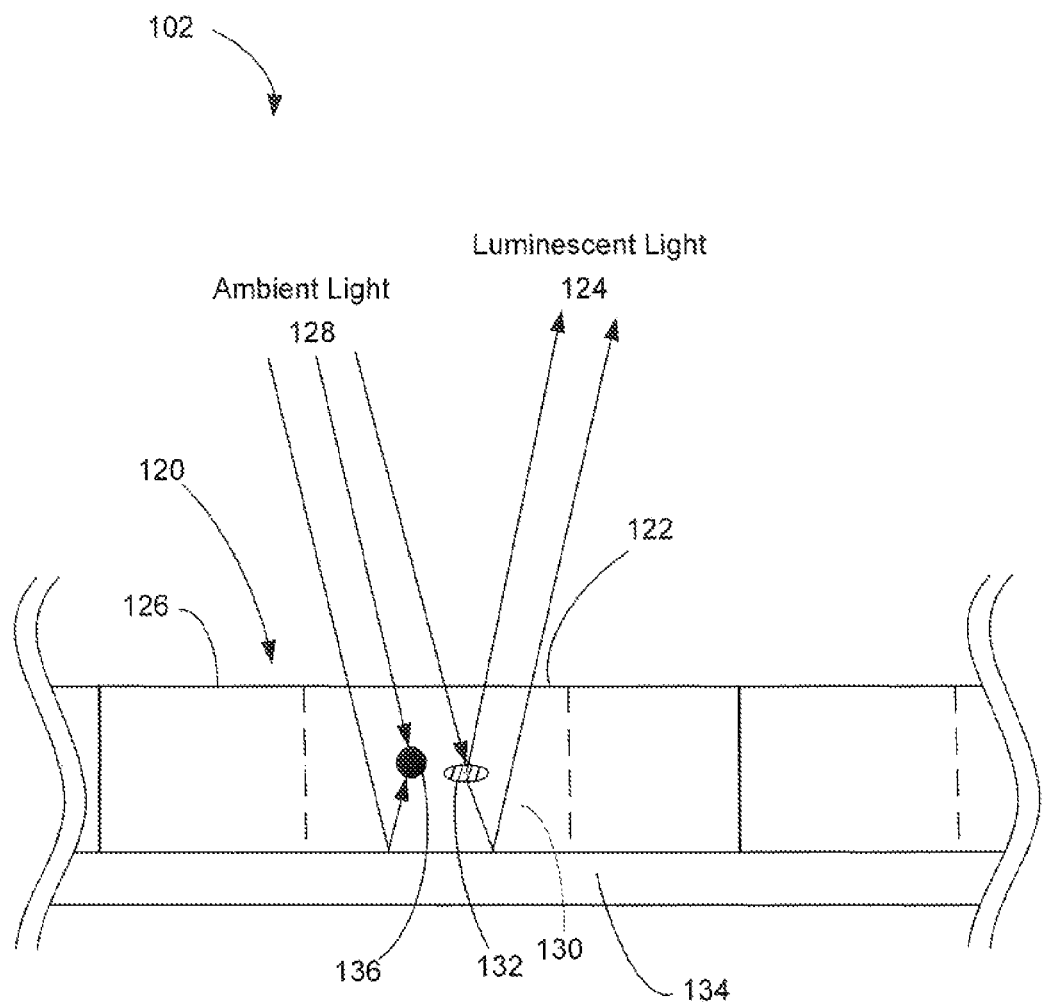
FIG. 2 is a schematic cross-sectional view of a color pixel of the reflective display device of FIG. 1 constructed according to an embodiment of the invention.

FIG. 2 shows a schematic representation of a pixel 120 of the display screen 102 in accordance with an embodiment of the invention. The pixel 120 has a plurality of sub-pixels, including a first sub-pixel 122. The pixel 120 has a top surface 126, upon which ambient light 128 impinges. The ambient light 128 illuminates the viewing side, or the front side, of the display pixel 120. As described in greater detail below, the ambient light 128 is used as an energy source for the sub-pixels of the display pixel 120 to generate light of selected colors for viewing by a user. For instance, the first sub-pixel 122 may be intended to emit green light, while the other sub-pixels may be intended to emit blue light and red light, respectively. As used herein, the phrases "generate light" or "emit light" mean broadly that a sub-pixel returns light to a viewer, and such returned light is derived from reflecting the incident ambient light or converting the ambient light via luminescence.

To provide efficient utilization of ambient light to produce satisfactory colors, the display device 102 may utilize luminescence to generate the colors to be emitted by the sub-pixels. For instance, the first sub-pixel 122 may include a luminescent layer 130 that contains a luminescent material 132 that absorbs light of shorter wavelengths and emits light in the green band. As shown in FIG. 2, some wavelengths of the ambient light 128 impinging on the top surface 126 of the first sub-pixel 122 are absorbed by the luminescent material 130 and converted to green light. The luminescent light 124 is then emitted through the top surface 126 for viewing by a user. Luminescence can also be used by the other sub-pixels of the color pixel 120 for generating other colors, such as red and blue. In this regard, a luminescent material can strongly absorb light over a broad band of wavelengths shorter than a threshold wavelength and re-emit a large fraction of the absorbed energy at energies below the absorption threshold. Thus, some otherwise wasted light can be converted into a desired color, thereby enabling more efficient utilization of ambient light to provide greater lightness and better color saturation.

The luminescent material 132 may emit luminescent light in various directions, including directions away from the top surface 126 of the pixel 120. To enhance the light output of the sub-pixel 122, a color-selective mirror is used to reflect the luminescent light back toward the top viewing surface, while absorbing light not of the desired color of the sub-pixel. For example, if the sub-pixel 122 is used to produce green light, the luminescent material 132 may absorb wavelengths from near UV up to a wavelength close to the green emission band, and emit in the green band. In this process, the red portion of the incident ambient light is not absorbed by the luminescent material. In that case, the color selective mirror should reflect the green luminescent light and some green wavelengths of ambient light that are not absorbed by the luminescent material, but absorb the red light so that the red light is not returned through the top viewing surface 126. Without filtering out the red light, the output of the green sub-pixel would be contaminated and would not appear green.

In the embodiment of FIG. 2, an effective color-selective mirror is formed by a combination of a broadband mirror 134 and a light-absorbing material 136 mixed into the luminescent layer 130. The broadband mirror 134 may be, for example, a layer of metal such as aluminum or silver. The light absorbing material, as described in greater detail below, may be light absorbing particles, such as pigments, that have a selected absorption band. For instance, for a green sub-pixel, the light-absorbing material is selected to absorb red light. In this way, the luminescent layer 130 serves two functions: color conversion and filtering. The luminescent material 132 generates the desired color by means of luminescence, while the light-absorbing material 136 forms a color filter that works with the broadband mirror 134 to remove undesired color or colors from the reflected light while still reflecting impinging ambient light for the wavelength band of the sub-pixel.

This approach of combining the luminescent material and the light-absorbing material in a single layer has multiple advantages. First, by not using a separate filter layer, the overall thickness of the sub-pixel 122 is reduced. This allows the reduction of optical losses that increase with thickness. It also mitigates parallax effects that can occur if the pixel thickness is too large a fraction of its lateral dimensions and reduces stray reflections from interfaces between layers with different indices of refraction. The reduced thickness also shortens the lengths of conductive vias needed for connecting different functional layers of the pixel, making it easier to fabricate the display device. Also, when separate filter and luminescent layers are used, one technical challenge is in depositing the luminescent material onto the filter layer without dissolving the filter layer or leaching out the absorbing dyes in the filter layer. Combining the luminescent material and the light-absorbing material into one layer avoids this fabrication issue.

Figure 3:
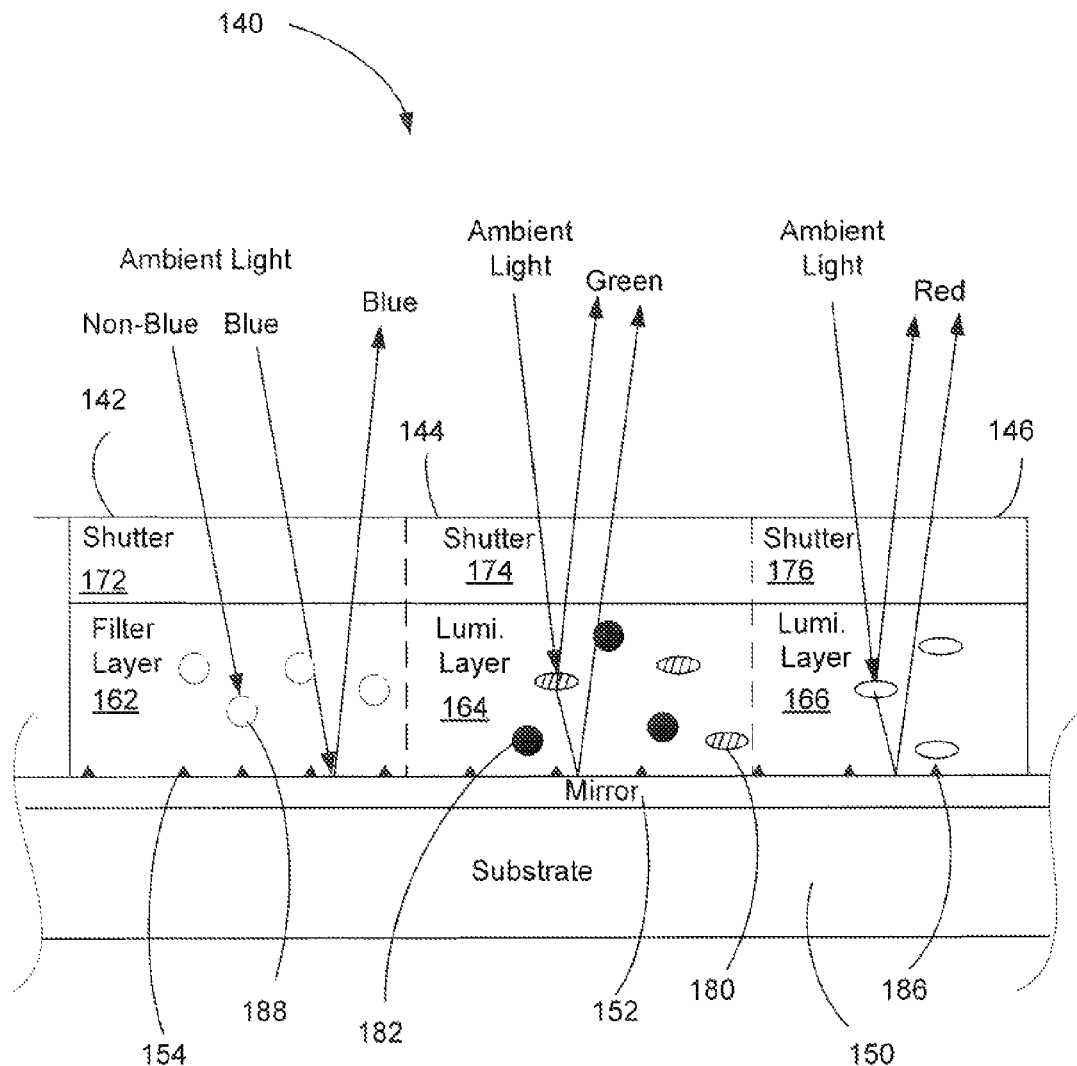
FIG. 3 is a schematic cross-sectional view of a more detailed example of a reflective color pixel.
Figure 4:
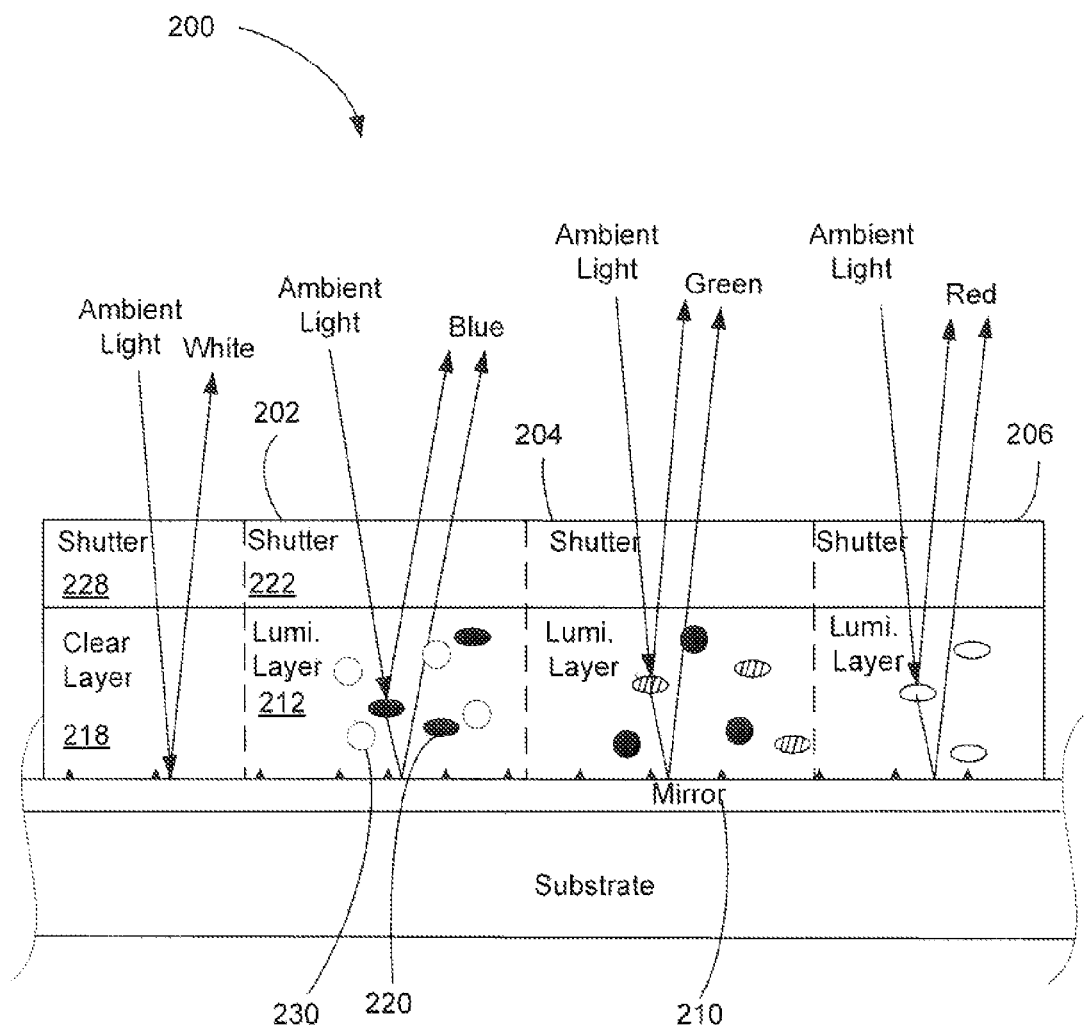
FIG. 4 is a schematic cross-sectional view of an example with an alternative configuration of a blue sub-pixel.

FIGS. 3-4 show more examples of reflective color pixels that utilize the sub-pixel construction described above. Turning first to FIG. 3, in this example, the reflective color pixel 140 has three sub-pixels 142, 144, 146, for generating blue, green, and red light, respectively. Alternatively, other sets of primary colors can be used for display. Also, a "white" sub-pixel can be added to provide additional area for augmenting white state lightness. It should be noted that not all the color sub-pixels need to employ the single luminescent/filter layer structure described above. For instance, in the embodiment of FIG. 3, only the green sub-pixel 144 utilizes such a structure. The blue sub-pixel 142 in this example generates blue light by means of wavelength-specific reflection without utilizing luminescence. In contrast, the red sub-pixel 146 uses mainly luminescence to generate the red color, but does not need additional filtering. The use of luminescence in red and green sub-pixel channels provides an increase in efficiency which allows for a reapportionment of sub-pixel areas to maintain white balance or optimize color gamut.

As shown in FIG. 3, the pixel 120 is built on a substrate 150. In a pixilated device, the substrate 150 can be the backplane of the device. Wells may be built on the substrate 150 in order to separate the sub-pixels of different colors. The substrate 150 is coated with a layer of metal, such as silver or aluminum, to form a broadband mirror 152. Surface texture or light-scattering features 154 may be formed on the substrate or metal layer to provide diffusion of the reflected light. The light-scattering features 154 can have various shapes, such as triangular or other profiles, for scattering incident light into different directions. The red, green and blue sub-pixels 146, 144, 142 can be patterned by photo-lithography or ink-jetting, or other suitable techniques, such as screen printing and stamp printing.

Each of the sub-pixels 142, 144, 146 has a shutter 172, 174, 176, respectively, as its top layer. The shutters 172, 174, 176 can be independently actuated to adjust the light transmission through each sub-pixel to result in the desired lightness for a particular image. In some embodiments, they may be black to clear (K/clr) electro-optic (EO) shutters, which may be in the form of, for example, dichroic dye-liquid crystal (LC) guest-host systems, electrophoretic, electro-wetting, or electro-fluidic cells. The shutters are capable of switching from transparent through shades of gray to opaque (black).

In the green sub-pixel 144, a luminescent layer 164 is disposed between the shutter 174 and the broadband mirror 152. The luminescent layer 164 contains luminophores 180 (illustrated as hashed ovals) for emitting green luminescent light. For instance, the green luminophores may absorb a broad spectrum of shorter wavelengths up to around 530 nm, and emit in the range of 530-570 nm. These luminophores 180 may be a series of organic relay dyes in a transparent host polymer. All but the lowest wavelength absorber of these dyes absorb in a wavelength band that overlaps strongly with the emission band of the previous one, allowing Förster energy transfer from one dye to the next in the series. For example, the green luminophores 180 may be a mixture of Pyromethene 546 and Coumarin 521T dyes. This combination can absorb near UV and blue light and emit green light at a peak wavelength around 530 nm. The broadband mirror 152 reflects the green light emitted downward by the green luminophores 180, as well as other visible ambient wavelengths. The diffusiveness of the reflection may help the luminescent light escape from the sub-pixel 144 instead of being trapped in waveguide modes within the luminescent layer 164.

To remove the red band in the incident ambient light, which is not absorbed by the green luminophores 180, the luminescent layer 164 also contains an absorbing material 182 for absorbing red light. In some embodiments, cyan dyes or cyan pigments can be used as the absorbing material. The cyan dyes or pigments should have minimal absorption in blue and green bands, because absorption in those bands will reduce the efficiency of the green luminophores.

Similar to the green sub-pixel, the red sub-pixel 146 uses luminescence to generate red light in addition to the reflected portion of the ambient red light incident on the sub-pixel. To that end, the red sub-pixel 146 includes a luminescent layer 166 disposed between the shutter 176 and the broadband mirror 152. The luminescent layer 166 contains luminophores 186 (illustrated as unfilled ovals) that absorb wavelengths shorter than red and emit in a red band, such as from 600 nm to 630 nm. The red luminophores 186 may each be a series of organic relay dyes. For instance, the red luminophores may be a mixture of perylene red, perylene orange, perylene yellow, and perylene blue in a PMMA matrix. That mixture absorbs most of the light below the wavelength of red and emits red light with a peak wavelength about 605 nm. In contrast with the green sub-pixel 144, however, the red sub-pixel 146 does not use a light absorbing material to remove longer wavelengths in the incident light that are not absorbed by the red luminophores 186. Such wavelengths are reflected by the broadband mirror 152 and become a part of the total emission of the red sub-pixel 146.

As mentioned above, the blue sub-pixel 142 does not utilize luminescence. The blue light output of that sub-pixel is produced by reflecting the blue portion of the incident ambient light. To that end, the blue sub-pixel 142 includes a filter layer 162 disposed between the shutter 172 and the broadband mirror 152. The filter layer 162 contains a light-absorbing material 188 that absorbs wavelengths longer than the desired blue band. For instance, the light-absorbing material may contain a mixture of cyan and magenta dyes or pigments. The blue portion of the incident light passes through the shutter 172 and the filter layer 162 and is reflected back by the broad band mirror 152. The rest of the light spectrum of the incident light is mostly absorbed during the passes through the filter layer 162.

FIG. 4 shows another embodiment of a color pixel. The color pixel 200 has a blue sub-pixel 202, a green sub-pixel 204, and a red sub-pixel 206. This embodiment differs from that of FIG. 3 in that the blue sub-pixel 202, like the green and red sub-pixels, uses luminescence to generate its intended color. Also, the pixel 200 includes a forth sub-pixel 208, which is a "white" sub-pixel for augmenting white state lightness. The blue sub-pixel 202 includes a luminescent layer 212 disposed between a shutter 222 and a broadband mirror 210. The luminescent layer 212 contains luminophores 220 that absorb near UV light and emit in a blue band, such as 455-485 nm. The luminescent layer 212 also contains a light absorption material 230 that absorbs wavelengths longer than the blue emission band. The broadband mirror 210 reflects the light emitted by the blue luminophores 220 back toward the top viewing surface, while the light-absorbing material 230 filters out green and red light in the incident light that is not absorbed by the blue luminophores. The white sub-pixel 208 includes a shutter 228, but the layer 218 between the broadband mirror 210 and the shutter is clear, as there is no need for color filtering. The incident ambient light goes through the shutter 228 and is reflected by the broadband mirror 210 back through the shutter, which can be adjusted to obtain the desired intensity of the reflected white light.

In a sub-pixel with a luminescent layer that combines a luminescent material with a light-absorbing material, better light output may be obtained by reducing the energy transfer from the luminophores to the light-absorbing material. For example, if the green sub-pixel 144 in FIG. 3 uses red-absorbing dye molecules or very small cyan (red-absorbing) particles well dispersed around the green luminophores 180, some energy transfer from the green luminophores to the red-absorbing species could occur, causing a quenching of the luminescent yield. This is because even a small overlap between the photoluminescence spectrum of the luminophores and the absorption spectrum of the light-absorbing material may allow energy transfer processes such as Förster exchange to occur between the two materials if they are within a distance of a few nanometers to 20 nanometers.

To reduce the Förster exchange from the luminescent material to the light-absorbing material, some embodiments use, as the light absorbing material, absorbing particles that are large relative to the distances over which Förster exchange occurs. These light absorbing particles can be, for example, pigment particles. Generally, such pigment particles are insoluble in water or organic solvents.

This approach takes advantage of the fact that Förster exchange is a short-range interaction, typically with a range of only ~5-20 nm. In an absorbing particle of sufficient size, only a relatively small number of light-absorbing molecules near the particle surface may become sufficiently close to the surrounding luminophores to allow Förster exchange to take place. Most of the other absorbing molecules in the absorbing particle are below the surface and sufficiently far away from the luminophores so as to be outside the Förster exchange range. At the same time, absorbing molecules greater than the Förster exchange range from the particle surface can still contribute to the absorption of the undesired optical wavelengths as long as these molecules are not further than a few times the optical penetration depth from the surface. Thus, using absorbing particles, such as pigments, as the light absorbing material can result in significantly reduced energy transfer from the luminophores while still maintaining effective absorption of the undesired wavelengths. The size of the absorbing particles may be, for example, between 50 nm and 200 nm in diameter. One example of a cyan (red-absorbing) particle is PB 15:3.

Figure 5:
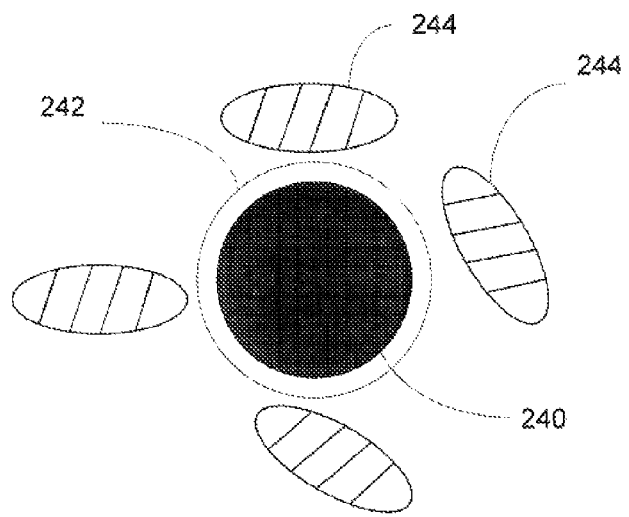
FIG. 5 is a schematic view of a coated light-absorbing particle used in an embodiment of the invention.

In some other embodiments, further reduction of energy transfer between the luminophores and the light-absorbing material may be achieved by coating the absorbing particles. As shown in FIG. 5, an absorbing particle 240 is coated with a shell layer 242 formed of an optically non-absorbing material that does not significantly absorb visible light. The shell layer 242 may be formed, for example, of silicon dioxide, polystyrene, etc. The shell layer 242 separates the absorbing molecules in the absorbing particle 240 from the surrounding luminophores 244 so that they are outside the Förster exchange range, thereby preventing efficient energy transfer between the two materials. The thickness of the shell 242 may be 2-20 nm.

Figure 6:
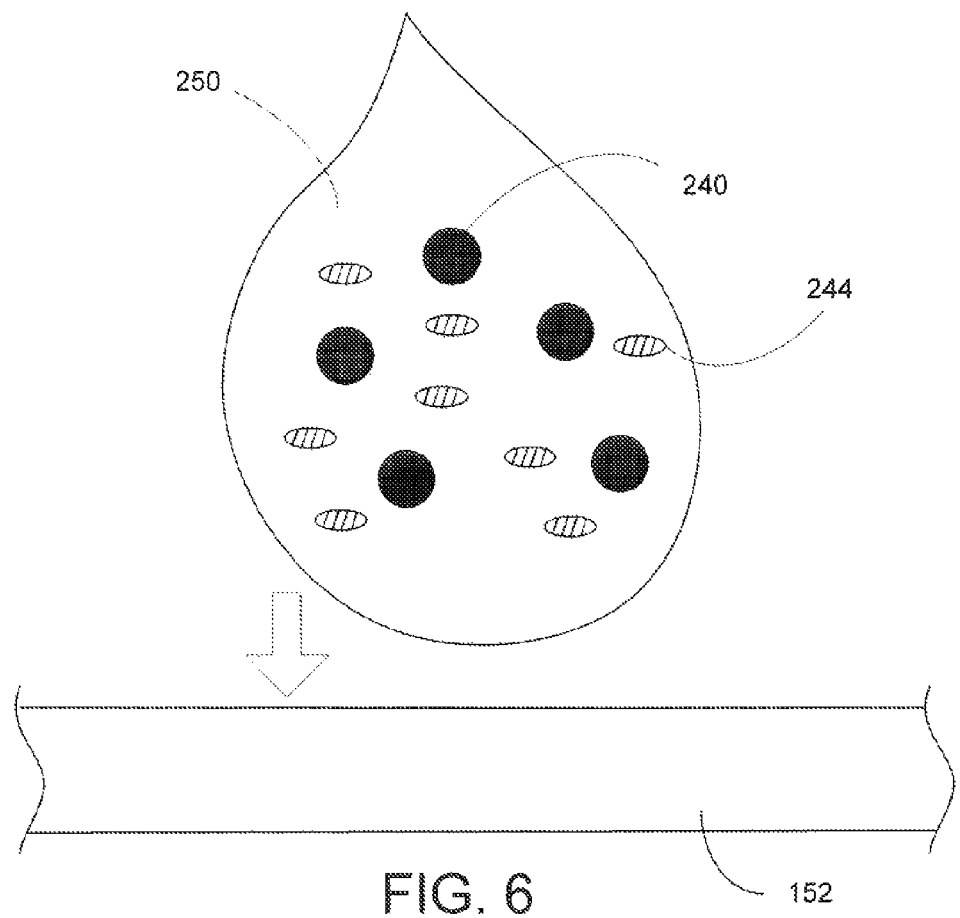
FIG. 6 is a schematic illustration of a process of forming a luminescent layer with a mixture of a luminescent material and a light-absorbing material.

A luminescent layer containing both luminophores and a light-absorbing material may be formed in various ways. As illustrated in FIG. 6, one way to form such a layer is by dissolving or dispensing the luminophores 244, the light absorbing material 240, and a transparent polymer host material in a solvent. The solution 250 is then deposited on the broadband mirror 152. The solvent evaporates, leaving a mixture of the luminophores and light-absorbing material in the host matrix over the broadband mirror 152. Solution 250 can also be formed by incorporating the luminophores 244 and light absorbing material 240 into UV or thermally curable monomers, such as methyl methacrylate, lauryl methacryalte, hydroxyethyl methacryalte, etc.

When pigment particles are used as the light-absorbing material, a more uniform luminescent layer may be firmed if the pigment particles and the luminophores form a well dispersed suspension in the solution. To that end, suitable surfactants and dispersants, such as EFKA4046, Triton X-100, Span 80, Span 85, Span 60, OLOA1100, BYK168 and Solsperse hyperdispants such as Solsperse 9000. Solsperse 17000, Slosperse 21000, etc., may be included in the solution.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A reflective color display pixel comprising:
    a top surface for receiving ambient light; and
    a plurality of sub-pixels including a first sub-pixel, the first sub-pixel having a broadband mirror and a luminescent layer disposed over the broadband mirror, the luminescent layer containing luminescent material particles fixably disposed within the luminescent layer for absorbing a portion of the ambient light and emitting light of a first color, and light-absorbing material particles fixably disposed within the luminescent layer and being different particles than the luminescent material particles for absorbing light of wavelengths longer than a wavelength of the first color.

2. A reflective color display pixel as in claim 1, wherein the first sub-pixel includes an electro-optic shutter disposed over the luminescent layer.

3. A reflective color display pixel as in claim 2, wherein the first color is selected from the group of green and blue.

4. A reflective color display pixel as in claim 1, wherein the luminescent material particles include luminophores each comprising a series of organic relay dyes.

5. A reflective color display pixel as in claim 1, wherein the light-absorbing material particles have a diameter in the range of 50-200 nm.

6. A reflective color display pixel as in claim 5, wherein the each of the light-absorbing material particles is coated with a shell of optically non-absorbing material.

7. A reflective color display comprising:
a plurality of pixels, each pixel having a top surface for receiving ambient light and at least a first sub-pixel for generating a first color, a second sub-pixel for generating a second color, and a third sub-pixel for generating a third color, the first sub-pixel having a broadband mirror and a luminescent layer disposed over the broadband mirror, the luminescent layer of the first sub-pixel containing luminescent material particles fixably disposed within the luminescent layer for absorbing a portion of the ambient light and emitting light of the first color, and light-absorbing material particles fixably disposed within the luminescent layer and being different particles than the luminescent material particles for absorbing light of wavelengths longer than a wavelength of the first color.

8. A reflective color display as in claim 7, further including a white sub-pixel.

9. A reflective color display as in claim 7, wherein the first color is green and the second color is red, and the second sub-pixel has a broadband mirror and a luminescent layer disposed over the broadband mirror and containing luminophores for absorbing a portion of the ambient light and emitting light in a red band.

10. A reflective color display as in claim 9, wherein the third color is blue, and the third sub-pixel has a broadband mirror and a filter layer disposed over the broadband mirror, the filter layer containing a light-absorbing material for absorbing wavelengths longer than a blue wavelength.

11. A reflective color display as in claim 10, wherein the filter layer of the third sub-pixel further contains a luminescent material for absorbing a portion of the ambient light and emitting in a blue band.

12. A reflective color display as in claim 7, wherein the light absorbing material particles have a diameter between 50 nm and 200 nm.

13. A reflective color display as in claim 12, wherein each of the light-absorbing material particles is coated with a shell of optically non-absorbing material having a thickness of from 2 nm to 20 nm.

* * * * *